United States Patent [19]

Larson et al.

[11] Patent Number: 5,501,319
[45] Date of Patent: Mar. 26, 1996

[54] CONVEYOR BELT WITH ASYMMETRIC EDGE LINKS

[75] Inventors: John Larson, Northfield, Minn.; Jack R. Raum, Winchester, Va.

[73] Assignees: Ashworth Bros., Inc., Fall River, Mass.; Northfield Freezing Systems, Inc., Northfield, Minn.

[21] Appl. No.: 263,071

[22] Filed: Jun. 21, 1994

[51] Int. Cl.$^6$ .................................................. B65G 21/18
[52] U.S. Cl. ........................................... 198/778; 198/852
[58] Field of Search .................................. 198/778, 831, 198/851, 852

[56] References Cited

U.S. PATENT DOCUMENTS

| | | |
|---|---|---|
| Re. 27,690 | 7/1973 | Roinestad et al. . |
| 3,570,651 | 3/1971 | Lanham et al. . |
| 3,920,117 | 11/1975 | Roinestad . |
| 4,078,655 | 3/1978 | Roinestad . |
| 4,867,301 | 9/1989 | Roinestad et al. . |
| 4,932,925 | 6/1990 | Roinestad et al. . |
| 4,951,807 | 8/1990 | Roinestad et al. . |
| 4,957,597 | 9/1990 | Irwin . |
| 4,972,942 | 11/1990 | Faulkner . |
| 5,054,609 | 10/1991 | Poerink . |
| 5,139,135 | 8/1992 | Irwin et al. . |
| 5,141,099 | 8/1992 | Baumgartner ........................... 198/778 |

Primary Examiner—Joseph E. Valenza
Attorney, Agent, or Firm—Banner & Allegretti, Ltd.

[57] ABSTRACT

The present invention provides a conveyor belt for traveling along both straight and laterally curved paths. A plurality of rods extend across the belt and are pivotally connected together by tractive links which are at least longitudinally expandable. The orientation of one edge link is reversed such that the terminal end thereof leads in the direction of travel of the belt in order to prevent damage to the links and/or the cage drive system when the belt is driven by the cage drive in a spiral system.

27 Claims, 9 Drawing Sheets

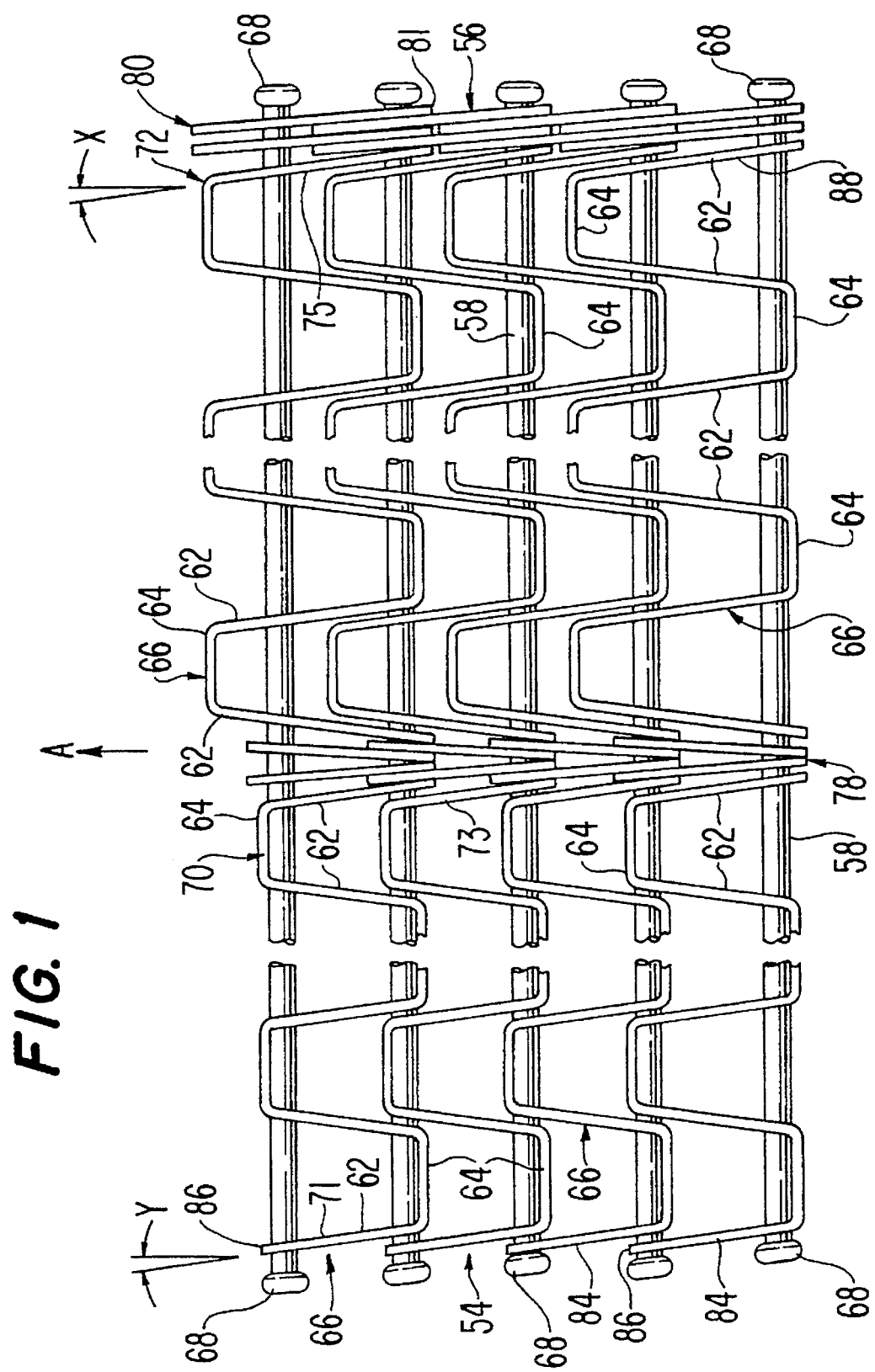

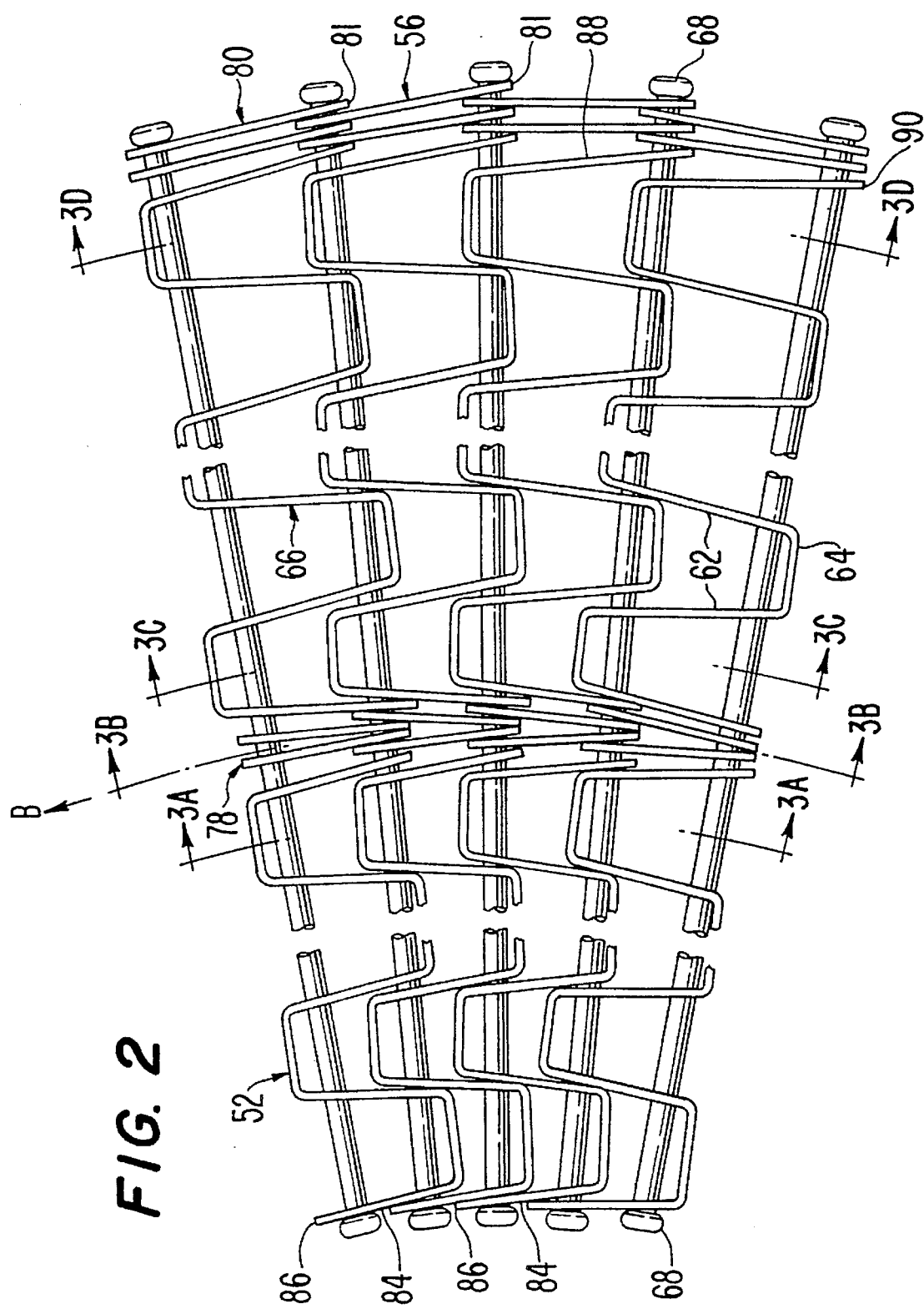

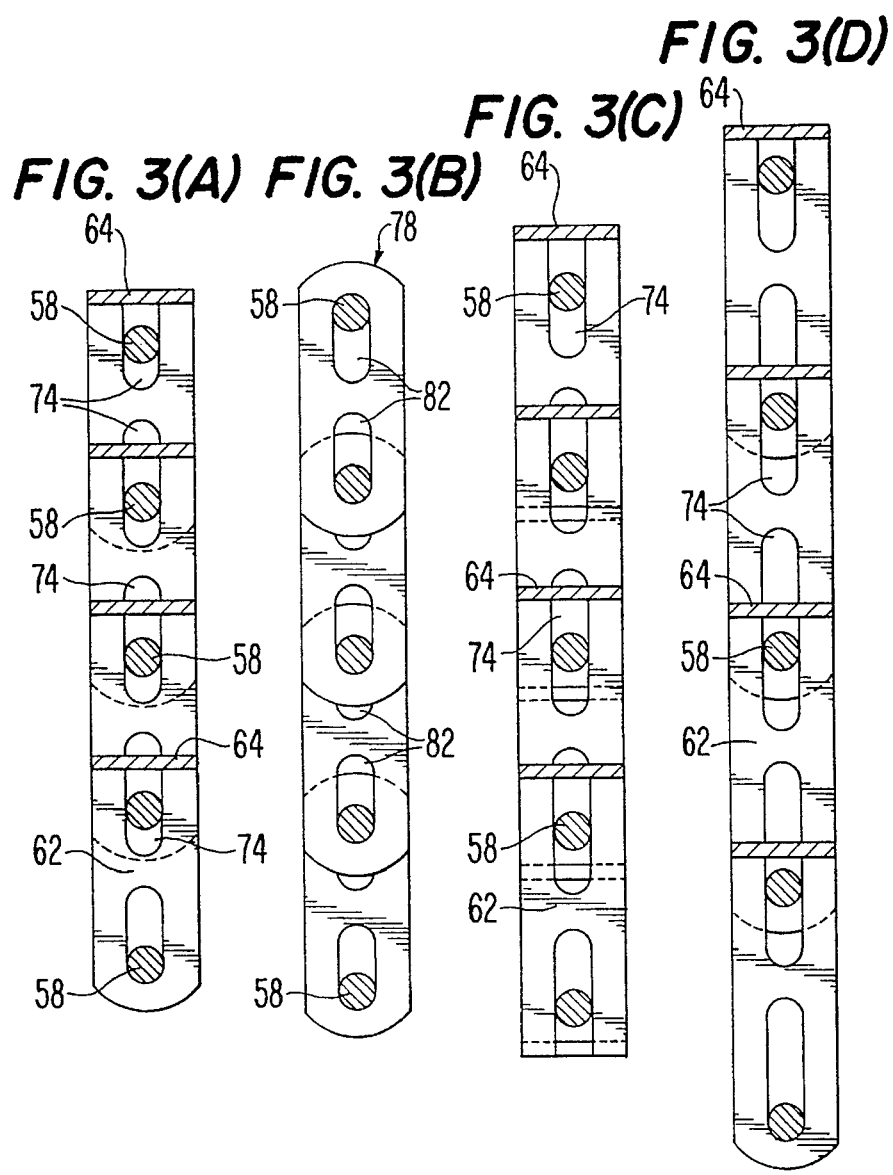
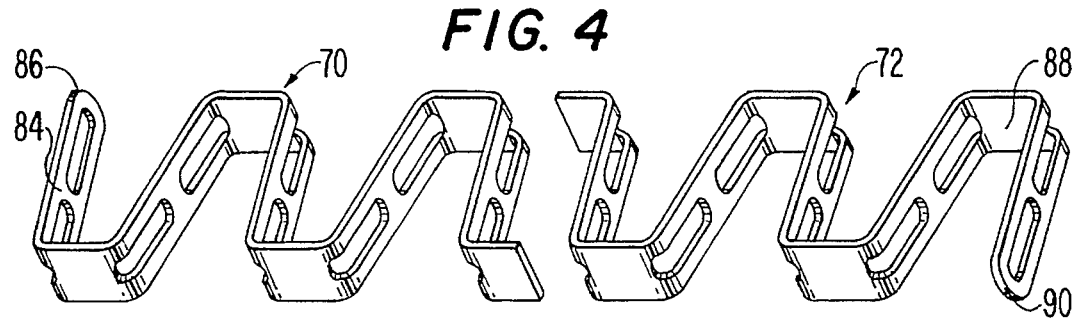

CONVEYOR BELT WITH ASYMMETRIC EDGE LINKS

TECHNICAL FIELD

The present invention relates generally to conveyor systems and belts therefor and, more particularly, to conveyor belts capable of traversing horizontal curves and relatively small radius horizontal curves as found in spiral conveyors.

BACKGROUND OF THE INVENTION

Among the many types of conveyor belts in general use today for carrying diverse products along both straight and horizontally curved paths two types are grid conveyor belts and flat wire conveyor belts. A grid belt is illustrated in U.S. Pat. No. 3,225,898. Such a belt comprises a plurality of spaced transverse rods slidably interconnected by two rows of connecting links disposed along the inner and outer edges of the rods. The connecting links are disposed in a nested relationship relative to one another with slots in the links slidably receiving the rods. Either edge of the belt can suitably collapse when it is necessary for the belt to travel around a horizontal curve.

The second type of belt, a flat wire belt, is illustrated in U.S. Pat. No. Re. 27,690, the entire contents of which are hereby incorporated by reference. In this flat wire belt, the transverse rods are slidably interconnected by transversely disposed flat wire tractive links having a width spanning substantially the entire length of the rods. The tractive links comprise a plurality of longitudinally disposed tractive members secured together by transversely disposed connecting members to form a plurality of U-shaped segments. Longitudinal slots are provided in the tractive members for slidably receiving the rods. As in the case of the grid type belt, the tractive links are arranged in a nested relationship relative to one another to enable the belt to collapse along either edge to traverse horizontal curves. The tractive links in prior art flat wire belts are generally positioned such that the terminal ends of the inner and outer links trail with respect to the direction of travel of the belt. This orientation is utilized in order to minimize the amount of damage should the belt contact any stationary framework. In addition, reinforcing bar links are often placed along the outer edges of the flat wire belt for bearing the tractive load of the belt as it traverses the curve and thereby preventing fatigue failure of the flat wire links.

Grid and flat wire belts have enjoyed substantial commercial success because of their ability to traverse horizontal curves while still providing an integrated carrying surface capable of supporting a great variety of products. Another desirable feature of such belts is that they can pass freely in vertical curves around relatively small end pulleys. Although certain prior art belts have required a relatively large horizontal turning radius, a small radius conveyor belt, such as that described in U.S. Pat. No. 4,078,655 which is hereby incorporated by reference, overcomes this limitation and further expands the usefulness of flat wire belts in a variety of conveyor installations.

Grid and flat wire type belts have found particular use in spiral conveying systems such as disclosed in U.S. Pat. Nos. 3,348,659; 3,682,295 and 4,078,655. In such systems, the belt travels in a spiral direction, and is driven by a cage-like driving drum that is located within the spiral. The drum includes cage bars which extend generally vertically and frictionally engage the inner edge of the belt. The drive in such system operates in an overdrive condition wherein there is relative motion of the cage bars forward with respect to the inside belt edge. Prior art belts have generally orientated the innermost edge of the belt with its end trailing in the direction of travel. Thus, as the cage bars pass by, the terminal ends can snag on the cage bars and become bent or damage the cage bars. This type of damage occurs most frequently under adverse conditions, such as when the tension in the belt is high. In wider conveyor belts, those generally more than three feet in width, the tractive links tend to compress in the transverse direction under the tension in the belt. As the tractive links compress, the outer links of the conveyor belt become angled further inward, thus making the terminal ends more prone to snagging on the cage bars by pushing them outward into the plane of the cage drum rotation. These terminal ends can be the terminal ends of the conveyor belt itself or of inside reinforcing links. As shown in FIGS. 10(A) and 10(B), the terminal ends either bend upwards or roll over the adjacent bar links. In both cases, damage to the terminal ends prevents the conveyor belt from properly collapsing and expanding when transversing horizontal curves.

SUMMARY OF THE INVENTION

The present invention provides a flat wire conveyor belt having a plurality of transversely disposed tractive links of flat wire each integrally including a plurality of laterally spaced substantially longitudinally disposed tractive members and a plurality of transversely disposed connecting members. Each connecting member connects adjacent tractive members and extends between opposite ends of the tractive members so that the tractive and connecting members of each tractive link form a plurality of alternating oppositely opening nestable segments. Each tractive member also has a pair of longitudinally spaced first openings extending laterally therethrough. A plurality of pivotal transverse rods extending laterally across the belt and through the first openings in order to interconnect the tractive links in transverse rows. The plurality of tractive links includes edge tractive links positioned adjacent the inner and outer edges of the belt. One edge link has a longitudinally disposed tractive member with a leading terminal end relative to the direction of travel of the belt and another edge link has a longitudinally disposed tractive member with a trailing terminal end relative to the direction of travel of the belt such that the edge links of the belt are asymmetrically orientated.

In a preferred embodiment of the invention, at least one of the first openings in each tractive member forms a longitudinally extending first slot. The transverse rods are slidable along the first slots to permit longitudinal collapsing of the belt during travel thereof around lateral curves. The longitudinal collapsing is graduated transversely thereof with the segments formed by one tractive link being nestably received within the segments formed by the longitudinally adjacent tractive links. In a further preferred embodiment, the tractive links include inner links pivotally interconnecting inner portions of the rods and outer links pivotally interconnecting outer portions of the rods. The inner links have a normal fully expanded and tractive condition in a normal orientation along a path. The outer links have a normal collapsed condition in the normal orientation and are then expanded from their normal condition in order to follow alternate paths curved laterally to one side.

The conveyor belt of the present invention is particularly well suited for use in a spiral conveyor system or other edge drive conveyor system because of its ability to transverse horizontal curves. The utilization of inner and outer links having varying collapsed and expanded conditions further enhances the ability of the belt to transverse horizontal curves and is particularly well suited for small radius spiral conveyor systems. In a spiral conveyor, a cage type driving drum frictionally engages the inner edge of the belt with cage bars and drives it through a helical path around the drum. In a preferred embodiment, the inner edge link of the conveyor belt is oriented such that the terminal end is leading with respect to the direction of travel of the belt and the outer edge link is oriented such that the terminal end is trailing with respect to the direction of travel of the belt. By orientating the inner edge link with a leading terminal end, snagging is prevented between the cage bars and the inner tractive links. Thus, damage to the cage bars and the spiral driving drum are prevented. In addition, by orientating the outer edge link with a trailing terminal end, damage is minimized should the belt contact any stationary framework.

BRIEF DESCRIPTION OF THE DRAWINGS

The novel features of the invention are set out with particularity in the appended claims, but the invention will be understood more fully and clearly from the following detailed description of preferred embodiments with reference to the accompanying drawings in which:

FIG. 1 is a plan view of a first embodiment of a conveyor belt according to the present invention in a normal orientation to follow a straight path;

FIG. 2 is a plan view of the embodiment of FIG. 1 in an alternate orientation to follow a laterally curved path;

FIG. 3(A)–(D) are cross-sectional views each taken along the lines (A)–(D) of FIG. 2 showing the belt of FIG. 1 in different curved orientations;

FIG. 4 is a perspective view of the tractive links of the conveyor belt shown in FIG. 1;

DESCRIPTION OF PREFERRED EMBODIMENTS

Figure 5:
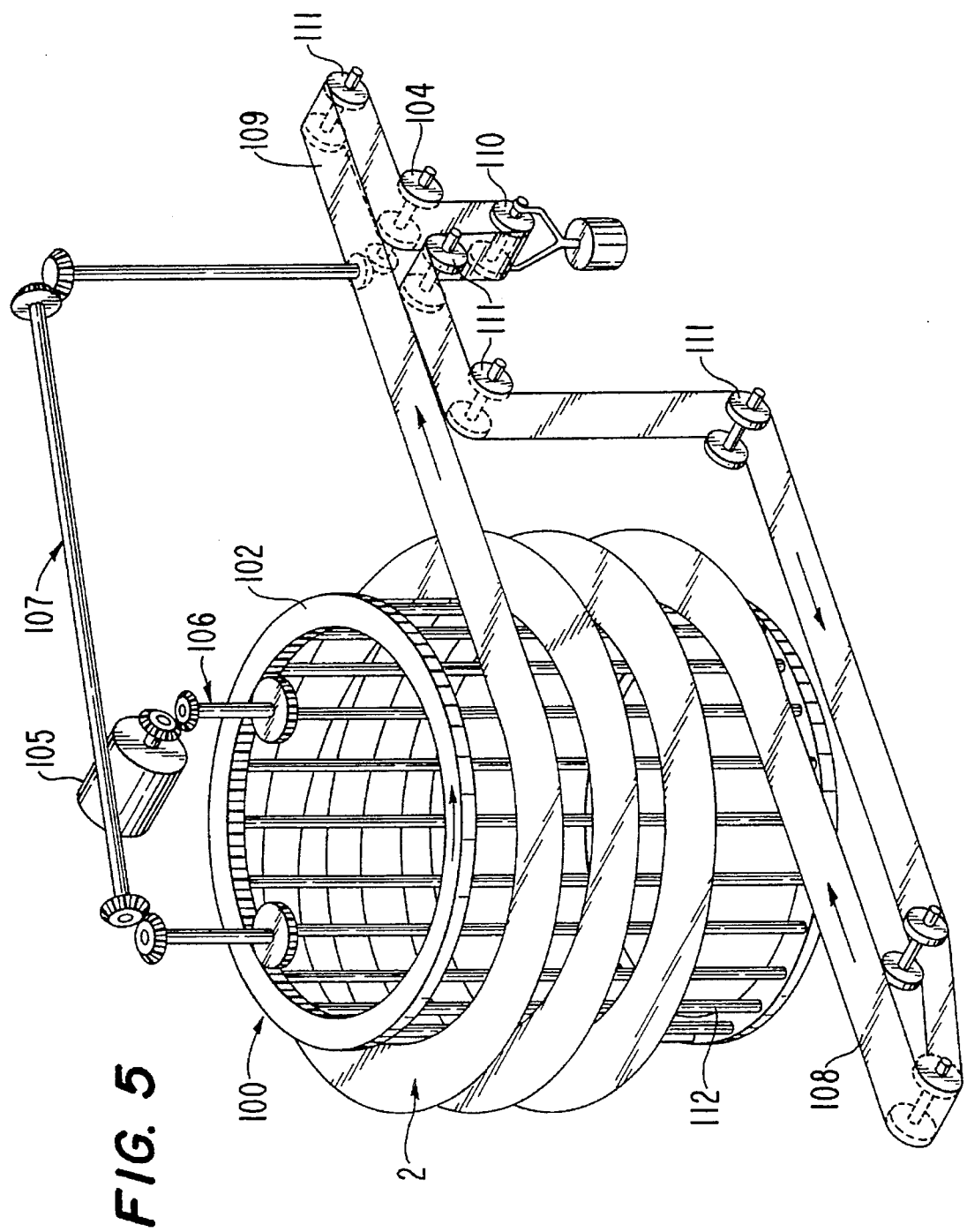
FIG. 5 is a schematic perspective view of a low tension conveying system including a spiral belt according to the present invention.

Referring to FIGS. 1–5, a flat wire conveyor belt 52 is shown according to a first embodiment of the present invention. Flat wire belt 52 has an inner edge 54 and an outer edge 56 and comprises a plurality of longitudinally spaced, transversely disposed rods 58 suitably extending between the inner and outer edges 54 and 56. Rods 58 are pivotally interconnected by a plurality of transversely disposed flat wire members 70 and 72.

Each flat wire member 70 and 72 comprises a plurality of substantially longitudinally disposed tractive members 62 connected together at one end by transverse connecting members 64. Adjacent connecting members 64 extend between opposite ends of the tractive members 62 to form a plurality of rows of alternating, oppositely extending U-shaped tractive links 66. Tractive members 62 slope outwardly in a longitudinal direction thereby allowing the links 66 to be disposed relative to one another in a partially nested relationship. The extremities of rods 58 are provided with enlarged heads or button heads 68 which prevent the flat wire members 70, 72 from sliding off rods 58.

Conveyor belt 52 is designed for use in a spiral conveyor system with flat wire members 72 disposed along the inside of the spiral and flat wire members 72 disposed along the outside of the spiral. Flat wire members 70 and 72 are disposed side-by-side and together span substantially the entire transverse width of the belt 52 between its inner and outer edges 54 and 56. When the flat wire members are so disposed, the tractive links 66 form a plurality of rows of links interconnecting the rods 58. Each of the tractive members 62 of the flat wire members is provided with two longitudinally spaced slots 74 for receiving adjoining rods 58. As shown in FIG. 3, one of the slots 74 is located adjacent the connecting member 64 which thus forms a front bearing surface for the rod 58. Although two elongated slots 74 are shown in each tractive member 62, the adjoining rods 58 may be received within only one continuous slot 74 or within one slot 74 at one end and a circular hole at the other end of tractive member 62. In a preferred embodiment, outer flat wire members 72 are substantially longer than the inner flat wire members 70. In addition, slots 74 in the outer flat wire member 72 extend forwardly past the slots 74 in inner flat wire members 70 to allow the outer flat wire member 72 to be fully collapsed when the inner flat wire members 70 are fully expanded.

A plurality of longitudinally disposed reinforcing bar links 78 and 80 are also preferably added to belt 52. Links 78 are arranged in a double, central row provided between the inner and outer flat wire members 70 and 72 and links 80 are arranged in a double, outer row located outside of member 72 along the outer edge 56 of belt 52. Alternatively, single rows or more than two rows of central or outer bar links may be used. Referring to FIG. 3, the bar links 78 and 80 are provided with two longitudinally spaced slots 82 adjacent each end thereof, corresponding to the slots 74 in the flat wire members 70, 72, for receiving adjoining rods 58. As illustrated, each bar link 80 overlaps an adjacent bar link 80 such that the outer bar links are staggered inwardly and the trailing end 81 of each link forms the outermost portion of each link in each transverse row. Thus, when viewed in the direction of travel A, bar links 80 are slanted in an inward angle X from their trailing to their leading ends.

The slots 82 in the central and outer bar links 78 and 80 also have a pitch (longitudinal distance between beating surfaces of successive links) at least as long and preferably slightly longer than the pitch of the slots 74 in the inner and outer flat wire member 70 and 72, respectively. The correlation between the pitch of the slots of the bar links 78 and the slots of the adjoining flat wire members 70 is such that the latter bear a substantial tractive load in the normal straight orientation and the bar links 78 bear a substantial tractive load in a curved orientation. Preferably, the correlation is such that the flat wire member 70 bears substantially all of the tractive load in the straight orientation and the bar links bear substantially of the tractive load in the curved orientation. To achieve the preferred correlation, the pitch of the bar links is slightly longer than the pitch of the flat wire members.

Neither the bar links 80 nor the flat wire member 72 bears any tractive load on the straightaway. However, in a particular curve when the tractive load is borne by the outer belt links as hereafter described, at least a substantial part of that load should be carded by the bar links 80. Again, it is preferred that the bar links 80 have a slightly longer pitch than the flat wire members 72 correlated so that all of any tractive load on the outer links is carded by the bar links. Outer bar links 80 are substantially longer than the inner reinforcing bar links 78 as in the manner of the outer flat wire members 72.

Referring now to FIG. 1, belt 52 is shown traveling in its normal orientation following a straight path A. In this orientation, inner flat wire members 70 are fully expanded with the rods 58 being disposed in a tractive engagement with the ends of slots 74 therein and the connecting members 64. Outer flat wire members 72 are fully collapsed with no tractive engagement occurring between the rods 58 and the members 72. Thus, the tractive load on belt 52 is distributed evenly over the width of the inner flat wire members 70 in the belt's normal orientation. Thus, the flat wire members 70 define rows of inner belt links 71 and central belt links 73 along the inner and outer portions of the members 70 respectively. The inner and central links share the tractive load in the normal straight orientation.

As belt 52 begins traversing a horizontal curve, inner flat wire members 70 will begin collapsing from their fully expanded position and outer flat wire members 72 will begin expanding from their fully collapsed position, as shown in FIG. 2. The curved direction of travel is indicated by arrow B. Unlike grid or flat wire belts which can collapse along either edge, belt 52 according to the present invention can collapse only along its inner edge 54. Outer edge 56 of belt 52 cannot be collapsed, but only expanded, from its straight travel orientation. Therefore, belt 52 is adapted to traverse horizontal curves all of which bend in the same direction, i.e., to the same side, relative to the normal straight path. Depending on the design of the flat wire belt 52, three alternate tractive conditions may occur as the belt 52 traverses horizontally curved paths of varying radii.

As shown in FIG. 3, the first tractive loading condition occurs as soon as the belt begins to bend laterally from its normal straight orientation into a curved orientation. Thus, the inner links (along the inner portion of flat wire member 70) begin to collapse from their fully expanded tractive condition and transfer their load to the central belt links. At that point, the entire tractive load on the belt is carried by the central belt links. As previously described, it is preferred that all or substantially all of that load be carried by the central bar links 78. However, in some instances, a portion of the load may be borne by central belt links 73 defined by the outer portion of the flat wire member 70.

The second loading condition occurs where the inner belt links collapse until the outer links become fully expanded and share the tractive load with the central links. When the outer links are thus loaded, it is preferred that all of such outer load be carded by the outer bar links 80. However, in some instances, a portion of the load may be carded by the outer links along the outer portion of the flat wire member 72.

The third loading condition occurs when the inner links further collapse from the second condition which results in partial collapse of the central links. In this third condition, the entire tractive load on the belt is transferred to the outer links. Again, it is preferred in that condition that the entire load be carded by the outer bar links 80 but some load could be carried by the outer belt links 75 along the outer portion of the flat wire member 72.

The flat wire belt 52 may be designed with the pitch of the various links correlated to permit the belt to reach one, two or all three of the alternative loading conditions. Specifically, if the inner belt links reach full collapse before the outer belt links reach full expansion, only the first loading condition can occur. If the inner belt links reach full collapse simultaneously as the outer belt links reach full expansion, the first and second loading conditions can occur. Finally, if the outer belt links reach full expansion before the inner belt links reach full collapse and the central belt links can thus partially collapse as the inner belt links collapse further, the belt can be oriented to reach all three of the loading conditions.

Reinforcing bar links 78 and 80, are preferably included on belt 52 because they alleviate fatigue failure of the flat wire members as more fully described in Reissue Pat. No. 27,690. However, either the central bar links 78 or the outer bar links 80 or both may be eliminated in instances where fatigue stress may not be a significant problem. In that event, the central belt links 73 on the outer portion of the inner flat wire member 70 (those links near the center of belt 52) bear the entire tractive load which otherwise would be carried by the central bar links 78. Thus, the rods 54 will tractively engage the connecting members 64. Similarly, the connecting members 64 of outer belt links 75 on the outer portion of flat wire member 72 will come into tractive engagement with the rods 58 when the members 72 are fully expanded in the second and third loading conditions. This tractive engagement between the inner and outer flat wire links 70 and 72 and rods 54 may also occur to some degree even when the central and outer bar links 78 and 80 are used as previously described.

It can be shown mathematically and experimentally that the belts according to the above embodiment can traverse much tighter radius curves than belts of the type shown in Pat. No. Re. 27,690. Assuming commonly used link dimensions, it can be shown that the minimum inside radius for a typical prior art flat wire belt as shown in Pat. No. Re. 27,690, the minimum inside radius is normally 1.62 times the width of the belts, while for a flat wire belt 52 according to the present invention that minimum radius is reduced to 0.80 times the width of the belt. The ability of belts according to the present invention to traverse much tighter curves for a given width belt is a significant advantage.

Figure 9:
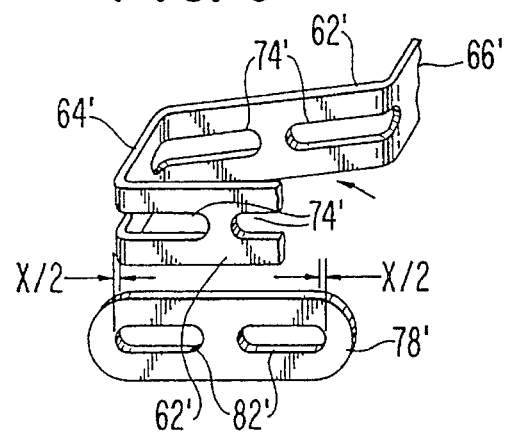
FIG. 9 is an enlarged perspective view of one of the bar links and a portion of one of the tractive links of the conveyor belt shown in FIG. 6.

The belt 52 is also advantageously used in conveying systems having a high tension sprocket type drive for the straight path and a low tension frictional edge drive for laterally curved paths, such as that shown in U.S. Pat. Nos. 3,348,659 and 3,682,295, both of which are incorporated herein by reference. Referring now to FIG. 9 a spiral low tension conveying system 100, of the type shown in U.S. Pat. No. 3,348,659, can incorporate the belt 52 of the present invention. Since the low tension system is fully described in that patent, only a brief description will be given here. In such a low tension system 100, a cage type driving drum 102 frictionally engages the inner edge of belt 52 through cage bars 112 to drive it with relatively low tension through a helical path around the drum. In addition, a positive sprocket drive 104 engages the belt along a straight portion thereof.

A motor 105 drives the drum 102 through gearing 106 and also drives the positive sprocket drive 104 through interconnected gearing 107. The belt travels from the sprocket drive 104, past weighted tension take up roller 110 and idler pulleys 111 to a straight loading portion 108, then in helical loops around the drum 102 to a straight discharge portion 109 and around another idler 111 back to the drive sprocket.

As is well known, the tension on the belt in the straight portion 109 is substantially higher than in the curved path. The positive drive 104 imparts sufficient tension to the belt to maintain the necessary frictional engagement with the drum. In some installations, a weighted tensioning roller could be used alone instead of the positive drive sprocket. In a spiral low tension conveying system 100, the maximum allowable loading on the belt is inversely proportional to the minimum inside radius which the belt can traverse.

Figure 10A:
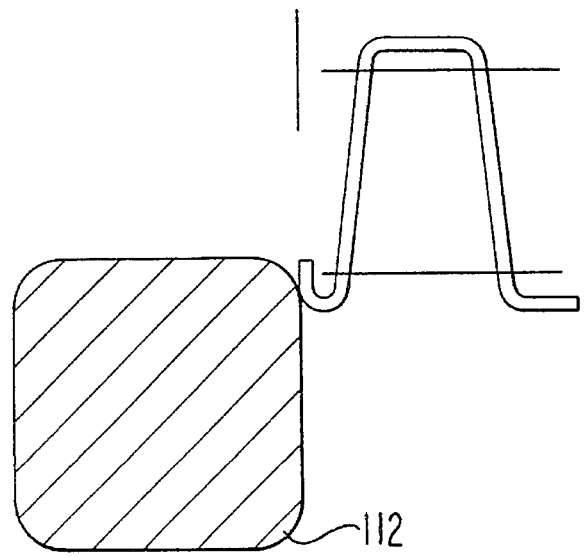
FIGS. 10(A) and 10(B) are enlarged plan views of the inside edges of belts, illustrating a damage condition.
Figure 10B:
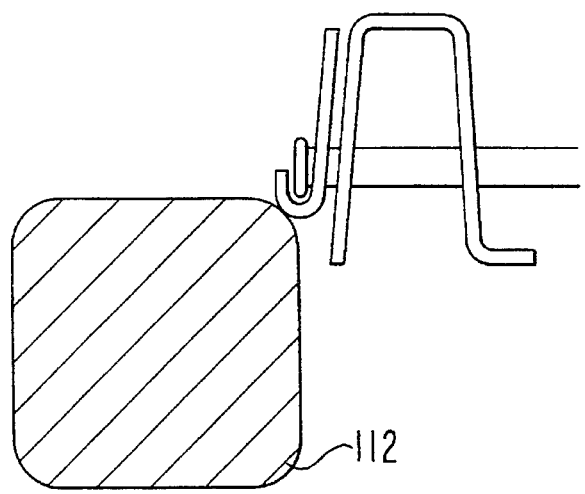

In prior art belts the terminal ends of the inner links trail with respect to the direction of travel of the conveyor belt in order to minimize the damage to the stationary framework around the spiral system, as well as in other portions of the conveying system. FIG. 10(A) and 10(B) illustrate the inner edge of such a belt and the problem that can occur when the inside edge of the belt is driven by a cage bar 112 of a cage drum. In spiral systems, the inside drum typically moves in an overdrive condition with respect to the spiral belt. That is, there is relative motion of the cage bars forward with respect to the inside edge of the belt. If the inner edge of the belt would remain in perfect alignment at all times, no problems would occur. However, under practical operating conditions, the inner ends of the flat wire links can bend inwardly, sometimes extending over the enlarged ends of the connecting rods. In addition, under adverse conditions such as high tension in the conveyor belt, the tractive links tend to compress in such a manner that the outer links slant further inward and thereby push the terminal ends further outward. Under such circumstances, the trailing ends of the flat wire tractive member would snag on the cage bar and cause damage to the end of the tractive member and/or the cage bar. FIG. 10(A) and 10(B) illustrate the damage caused to the tractive member, both the tractive link and the reinforcing bar link, wherein its terminal end is bent backward by the cage bar. This damage prevents the conveyor belt from properly collapsing and expanding when traversing horizontal curves.

Figure 11:
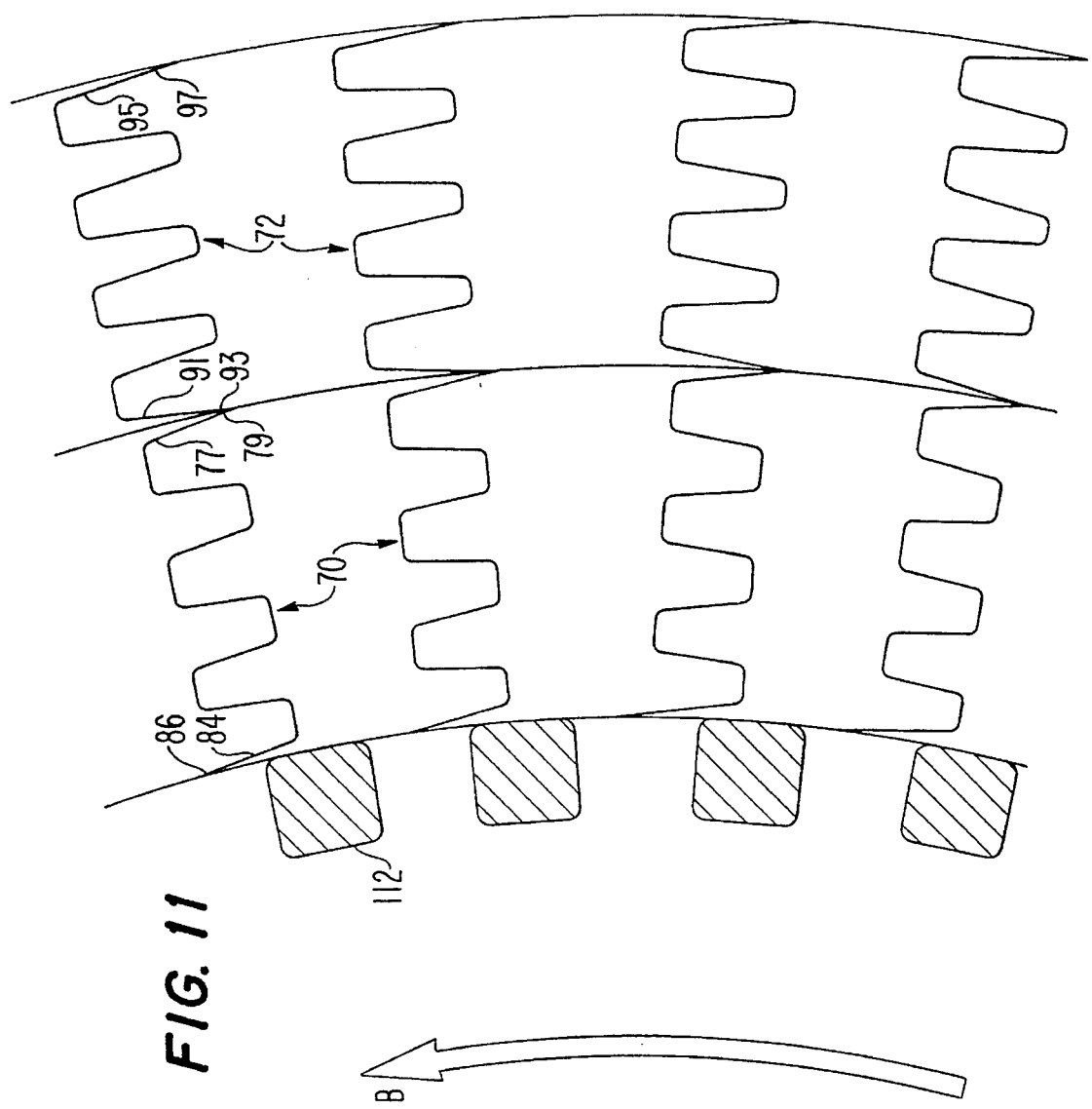
FIG. 11 is a diagrammatic plan view of a conveyor belt according to the first embodiment of the invention being driving by cage bars of a drive drum.
Figure 12:
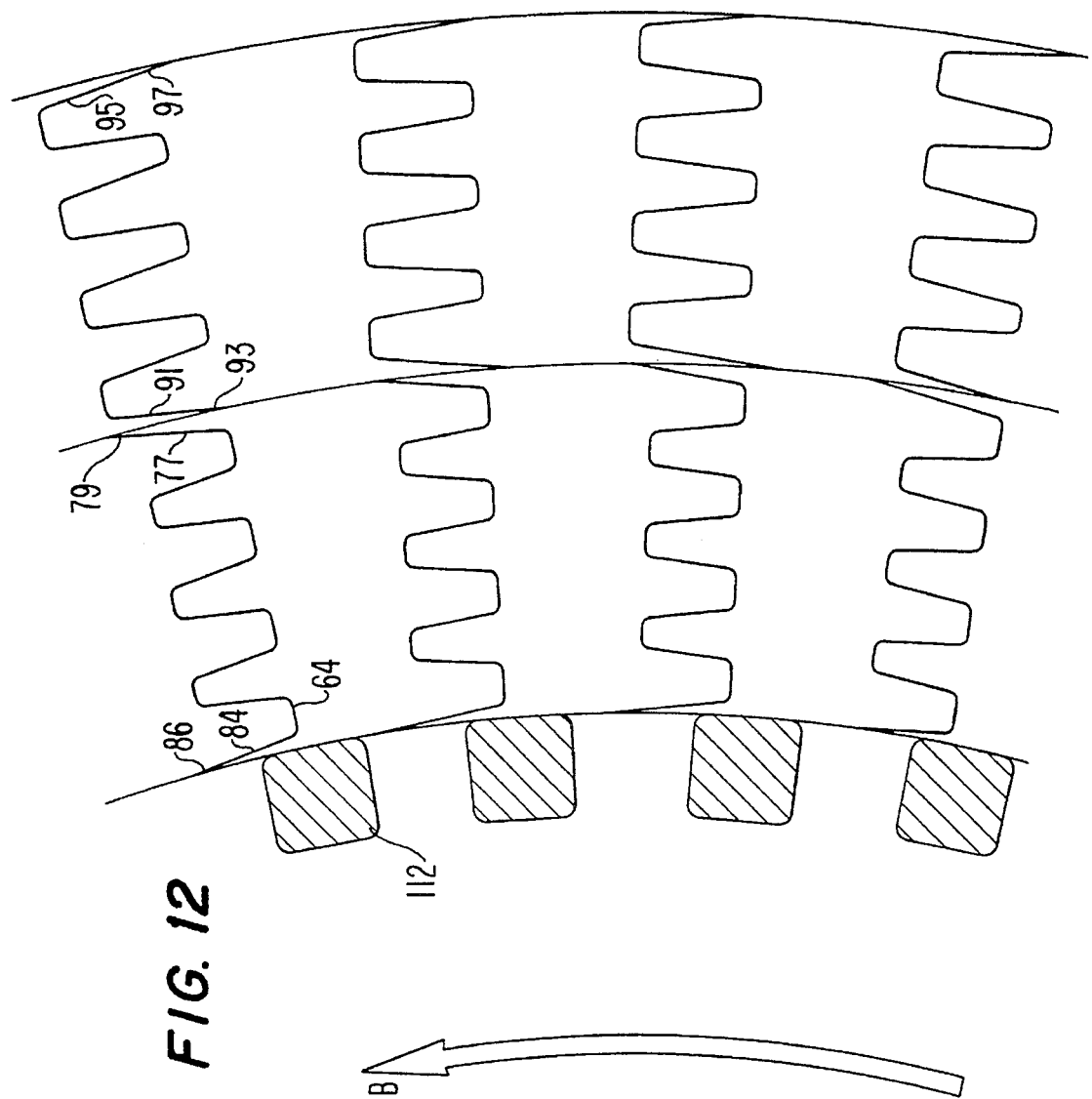
FIG. 12 is a diagrammatic plan view of a conveyor belt according to another embodiment of the invention being driven by cage bars of a drive drum.

In the present invention, the innermost edge tractive link 84 is oriented such that the terminal end 86 is leading with respect to the direction of travel of the conveyor belt. FIGS. 11 and 12 illustrate diagrammatically two embodiments of small-radius belts in accordance with the present invention, as driven by cage bars of an internal drive cage. As shown in FIG. 11, inner flat wire member 70 is formed such that the innermost edge tractive link 84 is oriented so that its terminal end 86 is leading in respect to the direction of travel of the conveyor belt A, while the remote edge tractive link 77 of inner flat wire member 70 is oriented with its end 79 in the trailing direction. In this embodiment, outer flat wire member 72 has the ends 93, 97 of its innermost and outermost edge tractive links 91, 95 both oriented in the trailing direction. In FIG. 12, the ends of innermost edge tractive link 84 and the outermost edge tractive link 77 of the inner flat wire member 70 are both orientated with their ends 86, 79 in the leading direction, while outer flat wire member 72 has the ends 91, 97 of its innermost and outermost edge tractive links 93, 95 both orientated in the trailing direction.

By orientating inner most edge tractive link 84 in this direction, snagging of the cage bar to the tractive link as it passes by is prevented. In this orientation, innermost edge tractive link is slanted in an inward angle Y, when viewed in the direction of travel. Thus, as seen in FIG. 11, the cage bar would first pass the inwardly disposed connection between tractive link 84 and the adjacent connecting links 64 and then gradually ride upon the inwardly slanted inside edge of tractive link 84, bending it inwardly about its point of connection to adjacent connecting member 64, without causing damage to the terminal end. This guiding action occurs even if the inner tractive link is bent inwardly by stresses.

The damage prevention and guiding action is also attained if reinforcement bars are placed adjacent the inside edge of the tractive link, since such reinforcement bars would also be slanted or orientated in a direction substantially parallel to the innermost edge of the tractive link 84, thus presenting an inwardly orientated bearing surface, which would allow the cage bar to pass by without causing damage. FIGS. 6–9 illustrate an embodiment of the present invention which utilizes reinforcement bar links along the inner edge of the belt.

Figure 6:
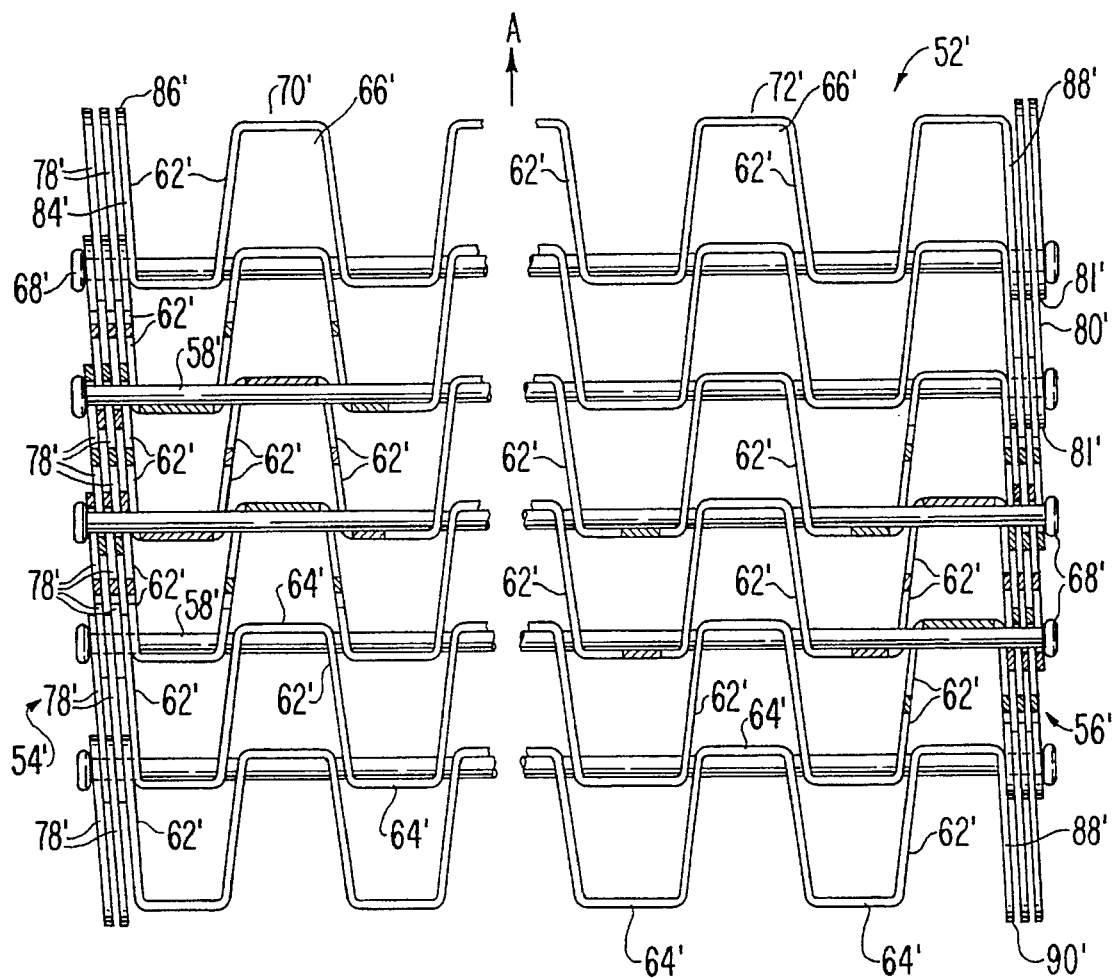
FIG. 6 is a plan view of a second embodiment of a conveyor belt according to the present invention in a normal orientation to follow a straight path.
Figure 7:
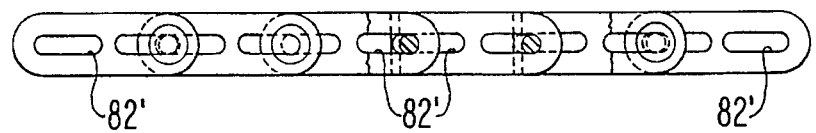
FIG. 7 is an elevational view thereof, with portions of the belt being shown in section.

Referring now to FIGS. 6–9, a conveyor belt 52' also for use on a spiral conveyor is depicted according to another embodiment of the present invention. Belt 52' is illustrated in FIG. 6 in a normal orientation for traveling in a straight path A and in FIG. 8 in an alternate orientation for following horizontally curved path B. Basically, conveyor belt 52' also comprises a plurality of transversely disposed tractive links 66', a plurality of transverse rods 58' which interconnect the tractive links, and a plurality of substantially longitudinally disposed bar links 78' and 80' positioned adjacent tractive links 66' along each edge of the belt 52'.

Figure 8:
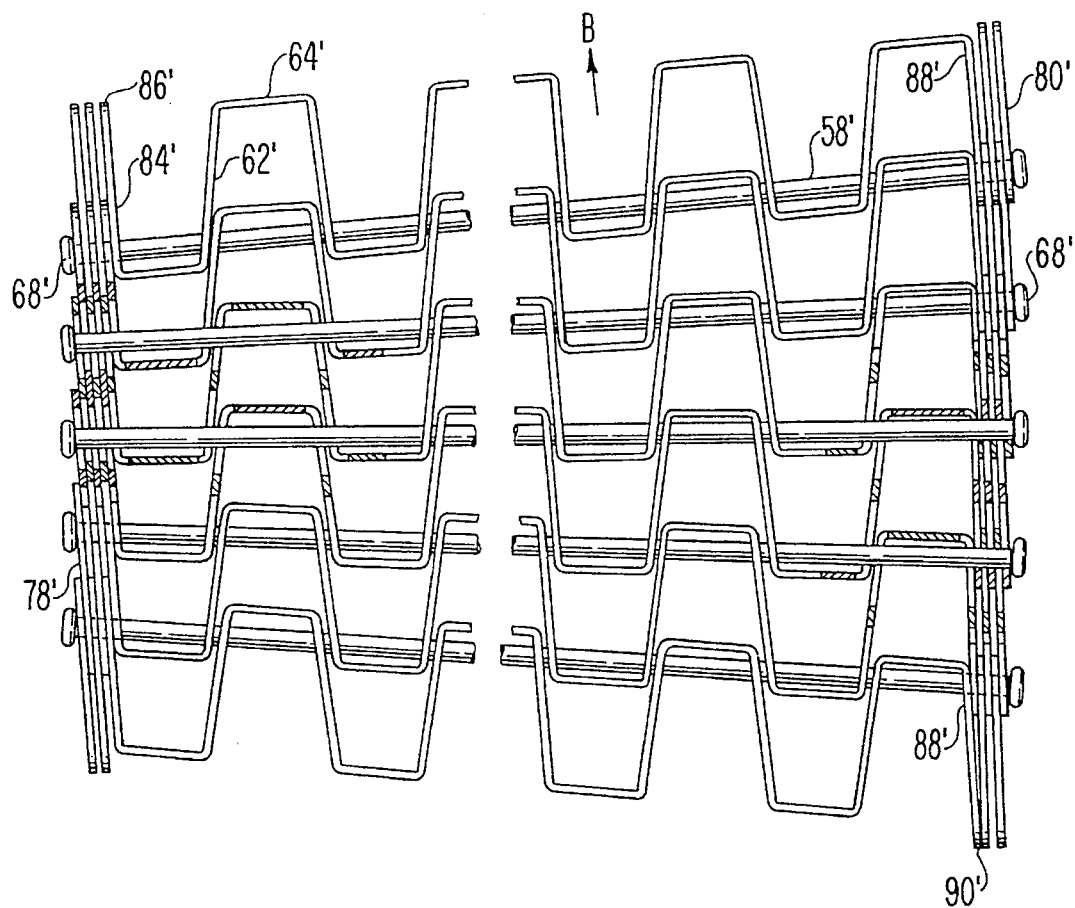
FIG. 8 is a plan view of the belt of FIG. 6 in an alternate orientation to follow a laterally curved path.

As in the first embodiment, tractive links 66' are fabricated from continuous strips of flat wire and are formed to provide a plurality of integral longitudinal wire members 62' which extend substantially longitudinally of the belt 52'. Adjacent ones of the longitudinal members are connected by integral transverse connecting members 64' which extend substantially transversely of the belt. As shown in FIGS. 6 and 8, adjacent ones of the connecting members extend between opposite ends of the longitudinal members and the longitudinal members are slightly laterally inclined so that the longitudinal and connecting members of each tractive link 66' form a plurality of alternating oppositely opening U-shaped segments.

Each longitudinal member 62' has a pair of longitudinally spaced, longitudinally extending slots 74' to interconnect tractive links 66' and are slidable therealong to permit belt 52' to collapse longitudinally, with one tractive link being nestably received within the U-shaped segments defined by the longitudinally adjacent tractive links, as shown in FIG. 8.

Alternatively, the longitudinally spaced openings in the tractive members may comprise a single longitudinally extending slot and a circular hole, as shown in U.S. Pat. No. 2,872,023 hereby incorporated by reference, instead of the two longitudinally extending slots 74' employed in the preferred embodiments of the conveyor belt of the invention illustrated in the drawings. In either instance, the belt is permitted to collapse longitudinally incident to the sliding of rods 58' along the slots.

When belt 52' travels along a substantially straight path A, as shown in FIG. 6, it extends longitudinally until traverse rods 58' engage the bearing surfaces formed by the outer ends of the openings in longitudinal members 62'. In the illustrated preferred embodiment of the invention, the outer ends of slots 74' extend slightly into the adjacent connecting members 64' so that when the belt is fully extended and rods 58' are engaged with the outer ends of the slots, the rods will abut the flat inner surfaces of the connecting members. As will be apparent, when the transverse rods and links are so disposed the tractive load will be substantially equally distributed between the longitudinal members 62' of each tractive link 66'.

The normal curved direction of belt travel is indicated by arrow B in FIG. 8 but it is to be understood that the belt can just as easily travel in the opposite direction.

When belt 52' travels around a lateral curve, as shown in FIG. 8, it collapses longitudinally in a graduated manner across the width thereof such as described above for conveyor belt 52. As a result of such graduated collapsing, transverse bars 58' slide away from the outer ends of slots 74' and the inner surfaces of the adjacent connecting members 64' which are nearest the inner edge of the belt so that the longitudinal members 62' nearest the inner edge of the belt carry substantially none of the tractive load. Consequently, in the absence of bar links 78', 80', the longitudinal members nearest the outer edge of the belt would carry substantially the entire tractive load. It has been found that when this occurs the longitudinal members 62' and connecting members 64' nearest the outer edge of the belt will be subjected to bending forces which cause tractive links 66' to elastically deform or flex, particularly at the juncture between the longitudinal and connecting members. Repeated elastic deformation of the tractive links induces fatigue failure at the aforementioned junctures, necessitating frequent replacement of the links.

This problem is obviated by bar links 78', 80' which, similarly to tractive links 66', preferably are fabricated from flat wire. As shown in the drawings, the bar links are substantially longitudinally disposed and are positioned adjacent tractive links 66' along each edge of belt 52'. Bar links 78', 80' each have a pair of longitudinally spaced, longitudinally extending slots 82' extending laterally therethrough through which transverse rods 58' extend for connecting the bar links to the belt. The rods are transversely restrained by appropriate means, such as by enlarged head portions 68'.

Alternatively, the longitudinally spaced openings in the bar links may comprise a single longitudinally extending slot and a circular hole, similar to the aforementioned alternative openings which may be employed in the tractive members. The slots in the bar links, similarly to the slots in the longitudinal tractive members permit the belt to collapse longitudinally.

The bar links will carry a tractive load when the transverse rods engage the bearing surfaces formed by the outer ends of the openings therein. In the preferred embodiment of the invention, this occurs when transverse rods engage the bearing surfaces formed by the outer ends of slots 82'.

The longitudinal spacing between the bearing surfaces of each bar link is correlated with the longitudinal spacing between the aforementioned bearing surfaces of each longitudinal tractive member so that when the belt travels along a substantially straight path most of the tractive load of the belt will be carried by the tractive members and when the belt travels around a lateral curve a substantial portion of the tractive load will be carried by the bar links disposed along the outer convex edge of the belt.

Generally, the spacing between the bearing surfaces of each bar link should be at least as great, and preferably be greater than the spacing between the bearing surfaces of each longitudinal tractive member. As shown in FIG. 9, in the preferred embodiment of the invention the longitudinal spacing between the bearing surfaces of each bar link is greater than the longitudinal spacing between the bearing surfaces of each longitudinal tractive member by a distance x. This longitudinal spacing differential need not be great and preferably is only a few thousandths of an inch.

As will be evident from this description, when belt 52' travels along a substantially straight path, due to the aforementioned spacing differential, substantially none of the tractive load will be borne by bar links 78', 80'. However, when the belt travels around a lateral curve and collapses longitudinally in a graduated manner transversely thereof, rods 58' will slide away from the outer ends of slots 74' and the inner surfaces of connecting members 64' across the entire width of the belt, and will engage the bearing surfaces formed by the outer ends of slots 82' in the bar links 78', 80' which are disposed at the outer convex edge of the belt. When this occurs the tractive load will be transferred from the tractive links to the bar links and the latter will carry the entire tractive load as belt 52' travels around the curve.

By spacing the bearing surfaces of each bar link a greater distance apart than the bearing surfaces of each tractive member so that the bar links carry substantially none of the tractive load of the belt when it travels along a straight path, the bar links do not continuously subject the ends of transverse rods 58' to concentrated bending forces and the rods are less likely to fail. However, the longitudinal spacing differential between the respective bearing surfaces, distance x, should not be too great or the bearing surfaces formed by the outer ends of slots 82' in the bar links will not be engaged by rods 58' when the belt travels around lateral curves.

In the preferred embodiment of the invention a plurality of bar links 78', 80' are positioned adjacent tractive links 66' along each edge of belt 52'. However, the bar links may be positioned along only one edge of the belt if, for example, the path of the belt is such that only one edge thereof is primarily disposed on the outside of the lateral curves negotiated by the belt.

The bar links are arranged in longitudinally extending rows with each of the slots 82' in each bar link longitudinally overlapping one of the slots 82' in one of the longitudinally adjacent bar links. The preferred embodiment of the invention shown in the drawings has two such rows positioned along each edge of the belt to provide a structure which is suitable for most conveyor belt installations.

As in the first embodiment of the present invention, the innermost tractive links 84' are reversed from the prior art orientation such that the terminal ends 86' lead with respect to the direction of travel of belt 52'. In this orientation, innermost tractive links 84' is angled inward in the direction of travel, with the result that bar links 78' are also angled inward. The outermost tractive links 88' are also trailing relative to the travel of the conveyor belt in order to avoid damage to stationary framework. In addition, as shown in FIG. 6, the leading ends of bar links 78' are staggered outwardly whereas the trailing ends of bar links 80' are staggered inwardly relative to the direction of travel of the conveyor belt. That is, the leading ends of bar links 78' are located outermost on the rod and adjacent the inner enlarged head, while the leading ends of the bar links 80' are not located outermost on the rod but rather are located behind the trailing end of a bar link 80' which is located adjacent the outer enlarged head of the rod. By reversing the direction or stagger of bar links 78', in addition to the orientation of innermost links 84', problems encountered while driving belt 52' with an inside drive cage are reduced as discussed above.

Although the present invention has been illustrated in terms of preferred embodiments, it will be obvious to one of ordinary skill in the art that numerous modifications may be made without departing from the scope of the invention which is to be limited only by the appended claims.

We claim:

1. A flat wire conveyor belt having a direction of travel, for use in a conveyor system including an edge drive means for driving the belt in the direction of travel and a stationary support framework which supports the belt, said belt comprising:

a plurality of transversely disposed links of flat wire each integrally including a plurality of laterally spaced substantially longitudinally disposed first members and a plurality of transversely disposed connecting members each connecting adjacent ones of said first members, adjacent ones of said connecting members extending between opposite ends of said first members so that the first and connecting members of each flat wire link form a plurality of alternating oppositely opening nestable segments, each of said first members having a pair of longitudinally spaced first openings extending laterally therethrough;

a plurality of pivotal transverse rods extending laterally across the belt and having inner and outer ends along inner and outer edges of the belt, said rods extending through said first openings to interconnect said flat wire links in transverse rows;

wherein said plurality of flat wire links includes edge links positioned at the innermost and outermost edges of the belt, said innermost edge link having an edge longitudinally disposed first member with a leading terminal end relative to the direction of travel of the belt, and said outermost edge link having an edge longitudinally disposed first member with a trailing terminal end relative to the direction of travel of the belt such that said edge links of said belt are asymmetrically orientated;

wherein said innermost edge link is immediately adjacent the drive means and said innermost edge link having a leading terminal end relative to the direction of travel of the belt reduces damage to said innermost edge link caused by contact of said terminal end with the drive means; and wherein said outermost edge link is immediately adjacent the stationary support framework and said outermost edge link having a trailing terminal end relative to the direction of travel of the belt reduces damage to the outermost edge link caused by contact of said terminal end with the stationary support framework.

2. The belt of claim 1 wherein at least one of said first openings in each first member forms a longitudinally extending first slot, said transverse bars being slidable along said first slots to permit longitudinal collapsing of the belt during travel thereof around lateral curves, said longitudinal collapsing being graduated transversely thereof with the segments formed by one flat wire link being nestably received within the segments formed by the longitudinally adjacent flat wire links.

3. The conveyor belt of claim 2 wherein said plurality of flat wire links further includes inner links pivotally interconnecting inner portions of said rods and outer links pivotally interconnecting outer portions of said rods, said inner links having a normal fully expanded and tractive condition in a normal straight orientation, and said outer links having a normal collapsed condition in said normal orientation and are expanded from said normal condition in alternate curved orientations.

4. In a conveyor system including an edge drive means for driving a conveyor belt in a direction of travel and a stationary support framework for supporting the conveyor belt, the conveyor belt including a plurality of longitudinally spaced rods extending laterally across the belt and having inner and outer ends along inner and outer edges of the belt and central portions therebetween, flat wire link means arranged in at least two longitudinal rows along at least a portion of the belt for pivotally interconnecting the inner and outer ends of said rods, said link means including a plurality of links having laterally spaced substantially longitudinally disposed first members and a plurality of transversely disposed connecting members each connecting adjacent ones of said first members so that said first and connecting members of each link form a plurality of alternating oppositely opening nestable segments, said link means being at least longitudinally expandable along one of said rows, and said link means having inner and outer terminal ends along the innermost and outermost edges of the belt, the conveyor belt having a normal orientation to follow one path and alternate orientations with at least an expanded outer edge to follow alternate paths curved laterally to one side of said one path, the improvement comprising:

said inner terminal ends of said link means being immediately adjacent the drive means and orientated to lead with respect to the direction of travel of the belt such that damage to said links means caused by contact of said inner terminal ends with the drive means is reduced; and said outer terminal ends of said link means being immediately adjacent the stationary support framework and orientated to trail with respect-to the direction of travel of the belt such that damage to the links means caused by contact of said outer terminal ends with the stationary support framework is reduced;

said inner and outer terminal ends of the belt thereby being asymmetrically orientated.

5. The improvement of claim 4 wherein said links include inner links pivotally interconnecting inner portions of said rods and outer links pivotally interconnecting outer portions of said rods, said inner links having a normal fully expanded and tractive condition in said normal orientation, and said outer links having a normal collapsed condition in said normal orientation and are expanded from said normal condition in said alternate orientations.

6. The improvement of claim 5 wherein said inner and outer links have longitudinal slots slidably receiving said reds to permit said longitudinal expansion of said outer rows of links.

7. The improvement of claim 5 wherein said inner links each include an innermost link and an outermost link, said innermost link being immediately adjacent the drive means and including said leading inner terminal end relative to the direction of travel of the belt, and said outermost link being furtherest from the drive means and having a terminal end trailing with respect to the direction of travel of the belt.

8. The improvement of claim 5 wherein said inner links each include an innermost link and an outermost link, said innermost link being immediately adjacent the drive means and including said leading inner terminal end relative to the direction of travel of the belt, and said outermost link being furtherest from the drive means and having a terminal end leading with respect to the direction of travel of the belt.

9. The improvement of claim 4 wherein each said leading inner terminal end of said link means includes a longitudinal slot for slidably receiving one of said rods.

10. The improvement of claim 5 further comprising central link means including central links arranged in at least one longitudinal row pivotally interconnecting the central portions of said rods, said central links having longitudinal slots slidably receiving said rods and are located between said inner and outer links.

11. The improvement of claim 10 wherein said central links are bar links.

12. In a conveyor system having a substantially straight portion and a laterally curved portion, a conveyor belt having a direction of travel and a normal orientation for following said substantially straight portion and an alternate orientation for following said curved portion with the belt defining a concave inner edge and a convex outer edge along said curved portion, said conveyor belt including a plurality of longitudinally spaced rods extending laterally across the belt and having inner and outer ends along the inner and outer edges of the belt and central portions therebetween; link means including a plurality of links having laterally spaced substantially longitudinally disposed first members and a plurality of transversely disposed connecting members each connecting adjacent ones of said first members so that said first and connecting members of each link form a plurality of alternating oppositely opening nestable segments, said link means including inner links and outer links interconnecting the inner and outer ends of said rods; edge drive means including an engaging portion for engaging said concave inner edge of said conveyor belt to drive said belt along said curved portion; and stationary support means for supporting said conveyor belt, said link means having a leading innermost terminal end immediately adjacent said edge drive means and a trailing outermost terminal end immediately adjacent said stationary support means, said innermost terminal end of said link means including guide means for smoothly guiding the engaging portion of said edge drive means past said innermost terminal end of said link means such that said edge drive means does not snare said inner links, said link means being overlapped such that adjacent said trailing outermost terminal ends of said link means are staggered inwardly relative to said belt.

13. The conveyor system of claim 12 wherein said guide means includes overlapping said link means such that Said leading innermost terminal ends are staggered outwardly relative to the belt.

14. The conveyor system of claim 12 wherein said edge drive means comprises a rotatable driving drum, said engaging portion includes generally vertically extending cage bars, and said curved portion defines a helical path around said drum.

15. The conveyor system of claim 14 wherein said links adjacent said vertically disposed cage bars define innermost links each having an innermost terminal end leading relative to the rotation of said driving drum such that engagement of said terminal ends of said innermost links by said vertically disposed bars is prevented.

16. The conveyor system of claim 15 wherein said straight portion extends outwardly from said drum.

17. The conveyor system of claim 12 wherein said plurality of links include inner links pivotally interconnecting inner portions of said rods and outer links pivotally interconnecting outer portions of said rods, said inner links having a normal fully expanded and tractive condition in said normal orientation, and said outer links having a normal collapsed condition in said normal orientation and are expanded from said normal condition in said alternate orientation.

18. In a conveyor system including a flat wire conveyor belt having a direction of travel, an edge drive means for driving the belt in the direction of travel and a stationary support framework which supports the belt, the improvement comprising:

a conveyor belt including:
  a) a plurality of transversely disposed links of flat wire each integrally having a plurality of laterally spaced substantially longitudinally disposed first members and a plurality of transversely disposed connecting members each connecting adjacent ones of said first members, adjacent ones of said connecting members extending between opposite ends of said first members so that the first and connecting members of each flat wire link form a plurality of alternating oppositely opening nestable segments, each of said first members having a pair of longitudinally spaced first openings extending laterally therethrough;
  b) a plurality of transversely disposed bar links arranged in at least one longitudinally extending row, each of said bar links having a pair of longitudinally spaced second openings extending laterally therethrough; and
  c) a plurality of pivotal transverse rods extending laterally across the belt and having inner and outer ends along inner and outer edges of the belt, said rods extending through said first and second openings to interconnect said flat wire links and said bar links in transverse rows;

wherein one of said plurality of flat wire links and said plurality of bar links includes edge links positioned at the innermost edge of the belt, each said innermost edge link having a longitudinally disposed leading terminal end relative to the direction of travel of the belt, wherein one of said plurality of flat wire links and said plurality of bar links includes edge links positioned at the outermost edge of the belt, each said outermost edge link having a longitudinally disposed trailing terminal end relative to the direction of travel of the belt;

wherein said leading terminal end of said innermost edge link is immediately adjacent the drive means such that damage to said innermost edge link caused by contact of said innermost edge link with the drive means is reduced; and wherein said trailing terminal end of said outermost edge link is immediately adjacent the stationary support framework such that damage to the outermost edge link caused by contact of said outermost edge link with the stationary support framework is reduced.

19. The improvement of claim 18 wherein said innermost edge links include said bar links, said leading terminal end of each said bar link being immediately adjacent the drive means.

20. The improvement of claim 19 wherein said pair of second openings in each said bar link includes a leading second opening and a trailing second opening relative to the direction of travel of the belt, said leading second opening longitudinally overlapping said trailing second opening in one of said longitudinally adjacent bar links such that said bar links are staggered.

21. The improvement of claim 19 wherein said outermost edge links include said bar links, said trailing terminal end of each said bar link being immediately adjacent the stationary support framework.

22. The improvement of claim 21 wherein said pair of second opening in each said bar link includes a leading second opening and a trailing second opening relative to the direction of travel of the belt, said trailing second opening longitudinally overlapping said leading second opening in one of said longitudinally adjacent bar links such-that said bar links are staggered.

23. The improvement of claim 19 wherein said outermost edge links include said flat wire links, said trailing terminal end of each said flat wire link being immediately adjacent the stationary support framework.

24. The improvement of claim 18 wherein said innermost edge links include said flat wire links, said leading terminal end of each said flat wire link being immediately adjacent the drive means.

25. In a conveyor system including a flat wire conveyor belt having a direction of travel, an edge drive means for driving the belt in the direction of travel and a stationary support framework which supports the belt, the improvement comprising:

a conveyor belt including:
- a) a plurality of transversely disposed bar links arranged in at least two longitudinally extending rows, each of said bar links having a pair of longitudinally spaced openings extending laterally therethrough; and
- b) a plurality of pivotal transverse rods extending laterally across the belt and having inner and outer ends along inner and outer edges of the belt, said rods extending through said openings to interconnect said bar links in transverse rows;

wherein said plurality of bar links includes edge links positioned at the innermost edge of the belt, each said innermost edge link having a longitudinally disposed leading terminal end relative to the direction of travel of the belt, wherein said plurality of bar links includes edge links positioned at the outermost edge of the belt, each said outermost edge link having a longitudinally disposed trailing terminal end relative to the direction of travel of the belt;

wherein said leading terminal end of said innermost edge link is immediately adjacent the drive means such that damage to said innermost edge link caused by contact of said innermost edge link with the drive means is reduced; and wherein said trailing terminal end of said outermost edge link is immediately adjacent the stationary support framework such that damage to the outermost edge ,link caused by contact of said outermost edge link with the stationary support framework is reduced.

26. The improvement of claim 25 wherein said pair of openings in each said bar link includes a leading opening and a trailing opening relative to the direction of travel of the belt, each said innermost edge link having said leading second opening longitudinally overlapping said trailing second opening in one of said longitudinally adjacent bar links such that said bar links are staggered outwardly relative to the direction of travel of the belt.

27. The improvement of claim 25 wherein said pair of openings in each said bar link includes a leading opening and a trailing opening relative to the direction of travel of the belt, each said outermost edge link having said trailing opening longitudinally overlapping said leading opening in one of said longitudinally adjacent bar links such that said bar links are staggered inwardly relative to the direction of travel of the belt.

* * * * *